April 21, 1970 W. T. CARDWELL, JR 3,507,181

CUP-MOUTHPIECE WIND INSTRUMENTS

Filed Oct. 25, 1967 4 Sheets-Sheet 1

CUP-MOUTHPIECE WIND INSTRUMENTS

Filed Oct. 25, 1967 4 Sheets-Sheet 2

April 21, 1970 W. T. CARDWELL, JR 3,507,181

CUP-MOUTHPIECE WIND INSTRUMENTS

Filed Oct. 25, 1967 4 Sheets-Sheet 3

CUP-MOUTHPIECE WIND INSTRUMENTS

Filed Oct. 25, 1967 4 Sheets-Sheet 4

United States Patent Office 3,507,181

Patented Apr. 21, 1970

3,507,181

CUP-MOUTHPIECE WIND INSTRUMENTS

William T. Cardwell, Jr., 16731 Ardita Drive, Whittier, Calif. 90603

Filed Oct. 25, 1967, Ser. No. 678,042

Int. Cl. G10d *7/10*

U.S. Cl. 84—388 7 Claims

ABSTRACT OF THE DISCLOSURE

A method is described of determining an optimum shape for the air-column of a trumpet, trombone, or similar cup-mouthpiece wind instrument, so that the intonation of the instrument will approximate ideal intonation. The shape determination is ab initio; it does not merely correct, or improve known empirical shapes. The method involves initial measurements of the Helmholtz-resonator-termination effect of a mouthpiece representative of the mouthpiece to be used on the final instrument. The air-column, particularly the bell stem, is then shaped to give optimum intonation with that mouthpiece.

BACKGROUND OF THE INVENTION

Field of the invention

This invention pertains generally to the manufacture of musical wind instruments of the cup-mouthpiece family, which includes trumpets, trombones, alto horns, baritone horns, and tubas. It pertains particularly to the members of that family that are true trumpets in the classical sense that at least one-half of their air column is untapered. It pertains most particularly to the modern instrument that is known by the name "trumpet," which in the mid-twentieth-century is most commonly made "in B-flat," with a "tuning note" at 466 Hz., but which is also made in C with a tuning note at 523 Hz., in D with a tuning note at 587 Hz., etc. It is in the shaping of the smaller trumpets of higher pitch that the invention has found its chief use.

Description of the prior art

Trumpets have been made and played for literally thousands of years; and for at least several hundred years it has been known that the shape of the air column inside the trumpet (or one of its modern relatives, e.g. the trombone) determines the resonant frequencies to which the instrument responds. However, the air column shapes have been developed empirically, by trial and error, and no working theory of design has existed to enable a trumpet maker to determine the optimum shape, beginning only with a knowledge of the musically-desirable frequencies to which the instrument is supposed to respond. To the knowledge of the present inventor the nearest approach to a working theory of trumpet design, ab initio, was made by H Bouasse: Instruments à Vent," Librarie Delagrave, Paris, 1929. Bouasse was fully aware of the fundamental mathematical-physical problem of trumpet design, which is best stated in the form of the so-called mode paradox: (1) the frequencies of the open tones (the unvalved tones) of the trumpet are those that the trumpet air-column itself responds to as a passive resonator if it is closed off at the lip-plane of the mouthpiece, and yet (2) the ratios between the modal frequencies are those we would expect from a simple resonator that was open at both ends. Bouasse knew that the physical answer to this mode paradox is that the trumpet air column behaves as if it had a length that varies with frequency. (It should be emphasized here that *actual* length variation, such as produced by valves, or slide motion, is not being discussed). Bouasse knew that the flare of the bell stem must produce an apparent length variation with frequency and he tried to calculate what shape a bell should have to produce the musically-desired open tones. He came to a gloomy conclusion that it was impossible, using classical mathematical theory, to calculate the needed bell shape.

I have found that the approach of Bouasse to bell design was more nearly correct than Bouasse himself realized. The essential deficiency of his theory was that he tried to make the bell account for all of the apparent length variation, and the bell does not have to account for all of it. I have shown that the cup mouthpiece performs a significant part of the apparent length variation, and if the help that it provides to the bell is taken into account, it becomes possible to do what Bouasse tried to do, to make a quantitative calculation of the required shape for a bell that will produce correct intonation on a trumpet (or related cup-mouthpiece wind instrument).

Since Bouasse, and up to the present time, the nearest approach to the present invention was made in a 1961 patent to E. L. Kent, U.S. 2,987,950. FIGURE 5 of that patent shows an experimental awareness that the mouthpiece plays some role in varying the apparent length of a cup-mouthpiece wind instrument. However, the qualitative connection to bell design, ab initio, was not made by Kent. The Kent patent was concerned principally with improvements and modifications of existing shapes to make their intonaton better.

The distinction between trumpet bells made according to the present invention, and bells made according to the teachings of Kent in U.S. 2,987,950, may perhaps be most clearly indicated by pointing out that, in one sense, they are simpler than the Kent bells, which were composed or "at least three" catenoidal sections. Instead of using a plurality of corrective sections, each one intended to compensate for deficiencies of the others, I have discovered how to design a single catenoidal section so that it cooperates optimally with the cup-mouthpiece to be used, and produces a closer approach to ideal intonation.

Another distinction over the Kent invention is the avoidance of the phase-matching problems that were necessary to handle when three or more catenoidal bell sections of various flare rates were joined. The single catenoidal section of the bell stem in the present invention, whose main purpose is to raise the natural frequency of the second mode of the instrument, is joined to untapered tubing at the nodal position of the second mode to make a perfect phase-match at the frequency of that mode.

SUMMARY OF THE INVENTION

In all of the following text, the word "trumpet" will be intended to cover relatives of the trumpet, such as the trombone, particularly those relatives that come under the classical definition mentioned hereinafter. In accordance with the present invention, the design of a trumpet begins with a series of acoustic measurements on a mouthpiece representative of the one to be used on the final instrument. The mouthpiece is fastened to a tubing of constant inside diameter like that to be used in the middle part of the final instrument. The lip-plane of the mouthpiece is closed off with a microphone, and the distal end of the attached constant diameter tubing is left open. The open, distal end is then exposed to ambient sound of adjustable, continuously variable, frequency, and the response of the system, acting as a passive resonator is determined at a series of frequencies. The so-called resonance peaks are determined. From the noted resonance frequencies, the apparent-length-varying function of the mouthpiece can be calculated, and the lengths of the unflared, and flared, portions of the trumpet can be calculated, but it is more conservative to continue the experimental determinations until an actual experimental length of tubing is found, which in cooperation with the mouthpiece, produces upper modes closely approximating the musically desirable upper modes of the final instrument. The discovery, that (1) the intonation of the upper modes is regulated mainly by the mouthpiece, and (2) the mouthpiece and bell must cooperate properly over the entire, upper and lower, playing range, is the underlying essence of the present invention. After the system is found which will produce the musically desirable upper modes, a bell shape is calculated, using known theory relating apparent-acoustical-length to frequency, which bell does not upset the determined placement of the upper modes, but raises the lower modes, particularly the second mode, into its proper musical place. The entire trumpet comprises a mouthpiece acoustically similar to the one used in the experiments, a section of tubing of substantially constant diameter, and a catenoidal bell section, all with properly mated acoustical properties. It may comprise also certain other features commonly found on conventional, commercial modern trumpets: a leaderpipe between the mouthpiece and the constant-diameter section, a set of valves, and a terminating bell skirt of much greater flare rate than that of the main stem of the bell. Methods of taking these additional features into account are described in the detailed disclosure which follows the section immediately below.

DESCRIPTION OF THE PREFERRED EMBODIMENTS

Figure 1:
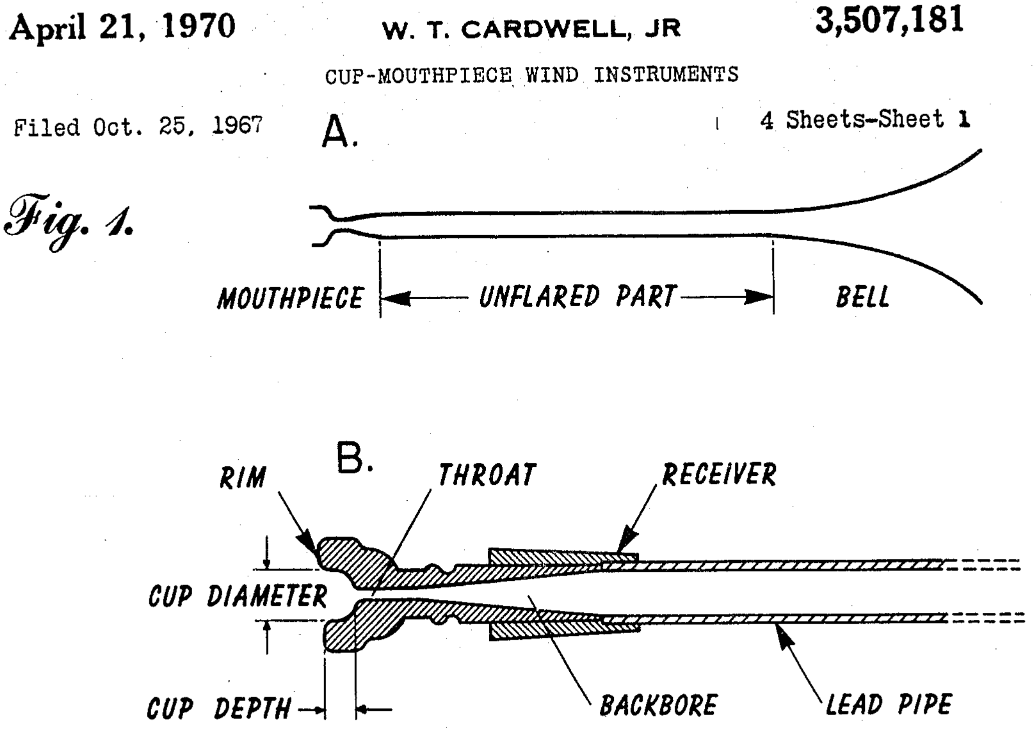
FIGURE 1 consists of two definitional diagrams, one of the trumpet as a whole, and the other of the frontal part of the trumpet, showing and naming the important parts of the mouthpiece.

Referring to FIGURE 1A, a trumpet is, by classical definition, an instrument having over half of its length untapered. If it tapers all the way, or most of the way, it is, by classical definition, not a trumpet, but a cornet. As the following description progresses, it will become evident that the musical wind instruments to which the invention applies most readily, are those which have a significant untapered or unflared part, although parts of the teachings apply to all cup-mouthpiece wind instruments. The trombone is obviously a member of the trumpet family, because the entire slide portion must necessarily be untapered in order to slide.

Referring to FIGURE 1B, the trumpet or any other member of the trumpet family, begins with a cup against which the lips are applied, and the cup is followed by a constriction, usually called the throat, which is exceedingly important to note for purposes of this specification. The cup and throat configuration turns out to have a vital acoustic relation to the bell on the distal end of the trumpet.

Figure 2:
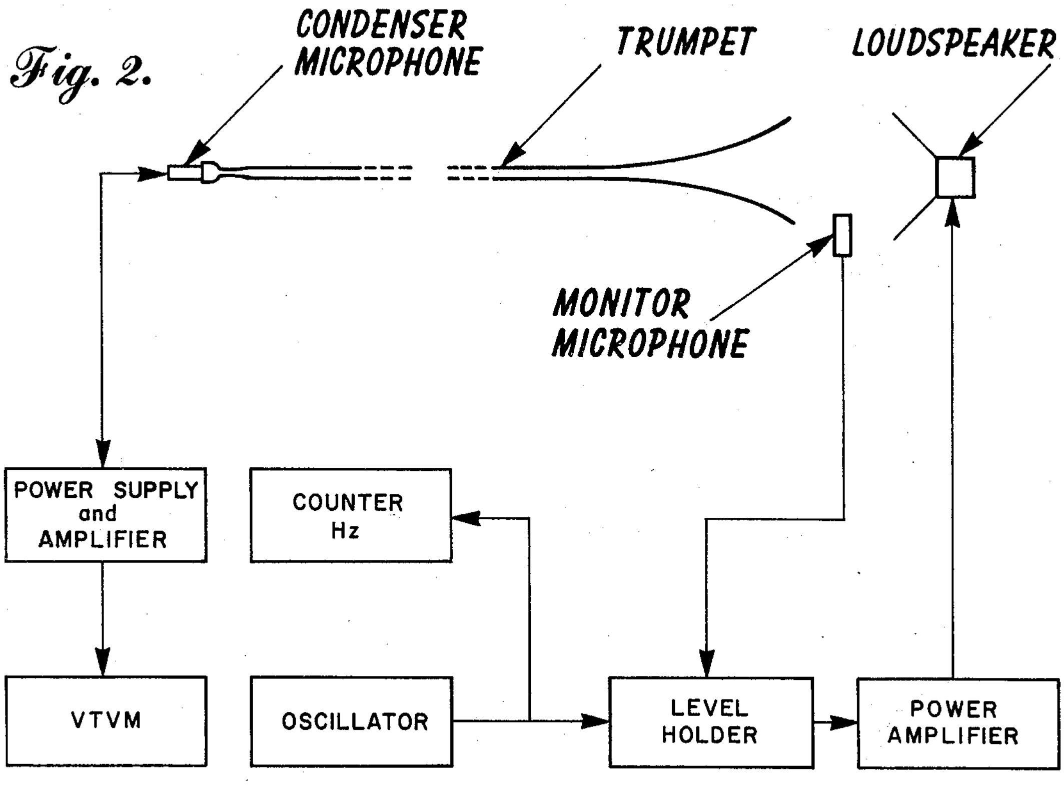
FIGURE 2 represents the experimental apparatus that is desirable to use in carrying out the method of the present invention.

Referring to FIGURE 2, which illustrates apparatus necessary in the design and testing of a trumpet according to the method of this invention, a trumpet, or part of a trumpet, for example, a mouthpiece and a piece of cylindrical tubing, or even just a mouthpiece, is closed off at the lip plane of the mouthpiece by a condenser microphone. The response of the microphone is amplified and read on a vacuum tube voltmeter. The air column of the system is excited by an external loudspeaker, which is actuated by a power amplifier that in turn is actuated by a variable frequency oscillator. However, the input to the power amplifier is controlled by a feedback loop involving a monitor microphone, so that the acoustic level of the speaker output is held constant. Frequencies may be read by various devices, but the present inventor has found it advantageous to use a digital counter that counts cycles for exactly a second and then reads out directly in Hz.

Figure 3:
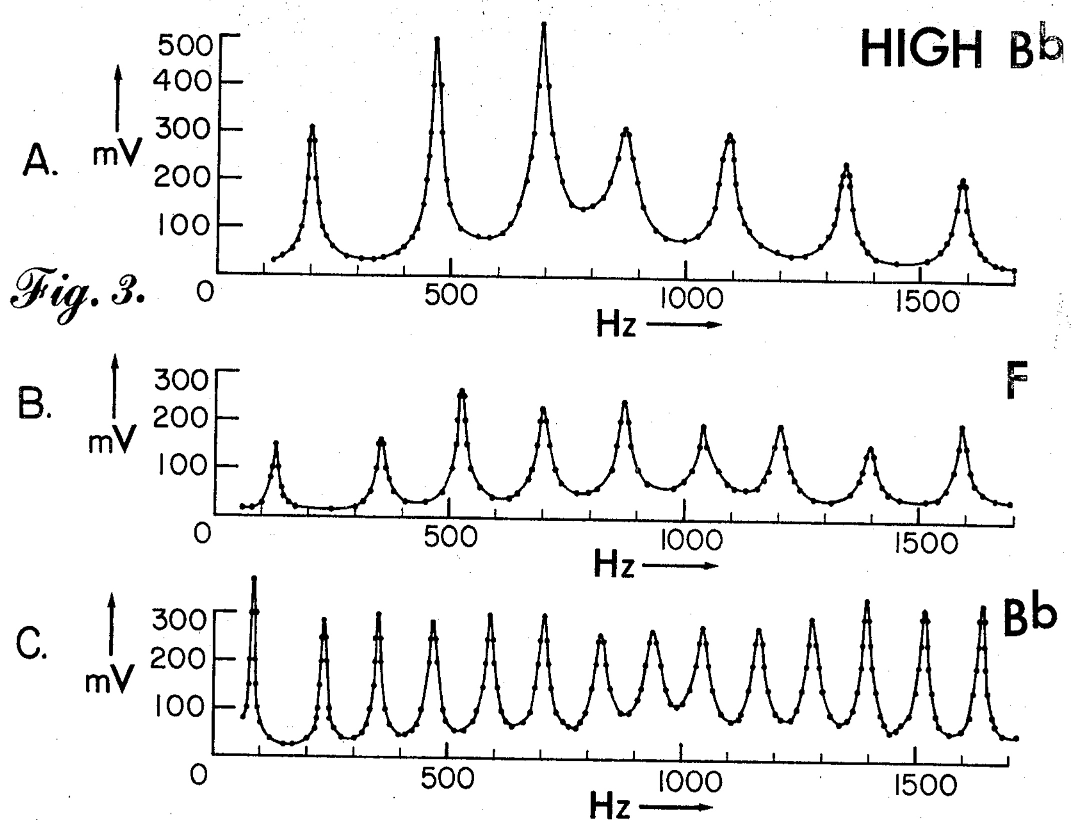
FIGURE 3 shows typical resonance data obtained by measuring trumpets with the apparatus of FIGURE 2. The frequencies of resonance peaks, such as those illustrated, are the main data used in the method of the present invention.

FIGURE 3 shows typical data obtained with the apparatus of FIGURE 2. All of the abscissae run from zero to 1700 Hz., and the ordinates are in millivolts, representing directly-read responses of the mouthpiece-end microphone. FIGURE 3C represents a conventional B-flat trumpet. FIGURE 3B represents the F trumpet whose design and construction is described below, and FIGURE 3A represents a high-B-flat piccolo trumpet. Briefly stated, the objective of all the efforts to be described below is to get the frequencies of the vibrational modes that are represented in FIGURE 3, into their musically desirable places on the frequency scale.

It has already been mentioned in a previous section that the physicist, Bouasse, knew that the frequencies of the open (unvalved) tones of the trumpet are those that the trumpet air-column itself responds to as a passive resonator if it is closed off at the lip plane of the mouthpiece, and yet the ratios between the modal frequencies are those one would expect from a simple resonator that was open at both ends. Here it is necessary to discuss that point mathematically.

If a simple pipe, of constant diameter, is closed at one end and open at the other, the air column inside that pipe will have natural vibrational frequencies given by Equation 1:

$$f_n=\frac{(2n-1)c}{4l} \qquad (1)$$

where $f_n$=frequency of the $n$th mode, of a closed-open pipe, in Hz.

$n$=number of mode $c$=velocity of sound $l$=length of the closed-open pipe.

The natural frequencies of such a pipe are, in accordance with the factor (2n−1) in the ratios of the odd numbers 1, 3, 5, 7, 9, etc. A set of such frequencies would not be useful in music as we now know and play it. For music, the natural open tone frequencies of a trumpet, or similar instrument, must have ratios comprising a complete harmonic series of whole numbers 2, 3, 4, 5, 6, etc. Such a set of frequencies would be obtainable from a simple pipe, open at both ends, which would have natural vibrational frequencies given by Equation 2:

$$F_n=\frac{nc}{2L} \qquad (2)$$

where $F_n$=frequency of the *n*th mode of an open-open pipe, in Hz.

L=length of the open-open pipe.

However, when a trumpet tube is placed to the lips of a blower, the effect is to produce closure at one end, or in more precise, modern terms, to terminate the tube with a high impedance, which for modal purposes, is substantially equivalent to closure.

It is not difficult to state mathematically what must happen if a closed-open system is to give modes like those of an open-open system. If the length of the closed-open system acted as if it varied with frequency in the particular way given by equating $f_n$ of Equation 1 and $F_n$ of Equation 2, treating $l$ as a variable, then the frequencies of the closed-open system would be in the ratios of the complete series of whole numbers. Equation 3 states the mathematical condition:

$$l=L(1-\tfrac{1}{2}n) \qquad (3)$$

Some grasp of the implications of Equation 3 is fundamental to the understanding of the entire remainder of this disclosure. Knowing, for instance, that the modern trumpeter must use the open tones of his instrument that correspond to the modes from the second to at least the eighth, one may first put $n=2$ into Equation 3 and then $n=8$, and calculate that at the second mode, a trumpet must act as if it were only 75 percent as long as a simple open-open resonator responding to the same frequency, and at the eighth mode, a trumpet must act as if it were 94 percent as long as the same simple, open-open resonator. Based on the theoretical open-open resonator length, this is a 19 percent variation, but based on its own shortest apparent length, this is a 25 percent variation in apparent length over the musically useful playing range.

Now, it has been known for decades that if a tubular acoustic resonator were not just a simple tube of constant cross section, but had a changing cross section, or flare, it would act as if its length were changing with frequency. The flare causes changes in phase velocity of the waves in the resonator, so that the phase velocity departs significantly from the ordinary velocity of sound, and this produces an effect as if the length of the resonator were changing. Flared horns have apparent acoustical lengths shorter than their actual length and the apparent lengths rise asymptotically toward the actual lengths as the frequency rises. (A good, general reference on this phenomenon is P. M. Morse, "Vibration and Sound," 2nd ed., McGraw-Hill (1948, pp. 265–288).)

So flaring horns have at least qualitatively, the property that is necessary for a trumpet, of increasing apparent-acoustic-length with frequency. However, as Bouasse found out, four decades ago, quantitative calculations of required horn shapes can be very discouraging (H. Bouasse: "Tuyaux et Resonateurs," Librairie Delagrave, Paris, 1929, esp. pp. 370–386; also, same author, publisher, and date: "Instruments à Vent," vol. I, esp. pp. 314–328). Calculations of required horn shapes to give the correct musical behavior lead to flares that are absurdly greater than the flares on existing instruments that are known to work satisfactorily.

Figure 4:
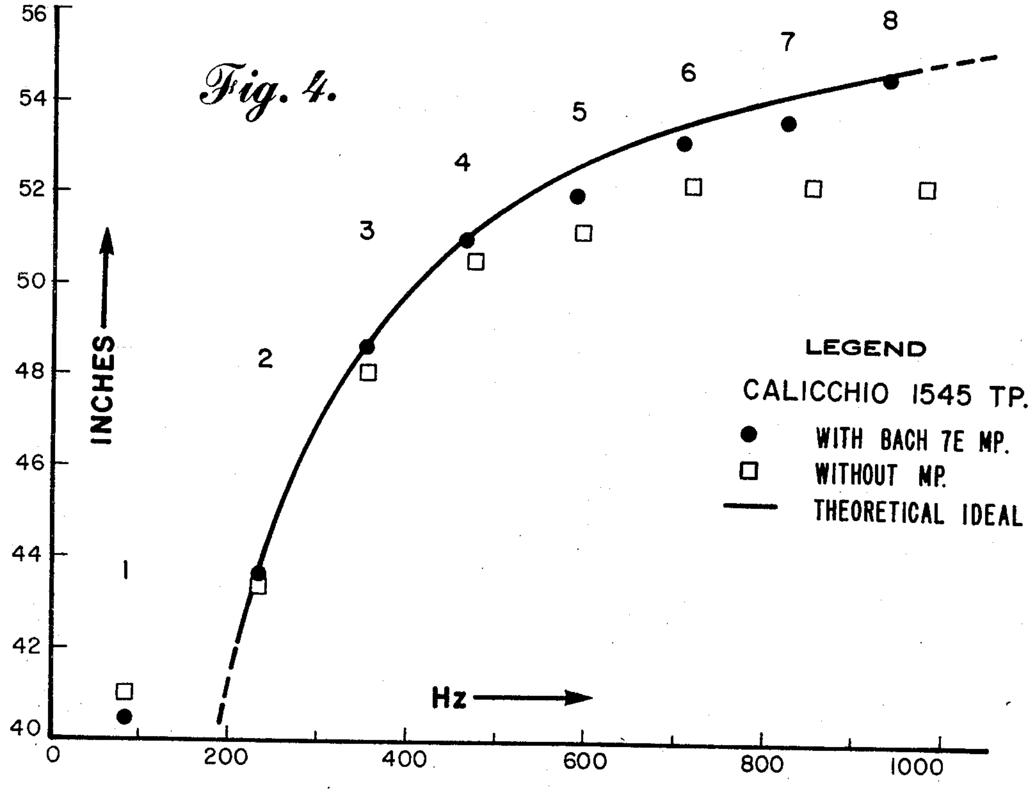
FIGURE 4 shows how a mouthpiece helps to give a trumpet its musically desirable intonation in its uppper playing modes.

The key to the solution of previous theoretical difficulties is a recognition of the fact that the flared horn part of a cup-mouthpiece musical instrument does not do the whole job of changing the apparent acoustical length with frequency. Part of the job is done by the cup-mouthpiece itself. This can be shown both experimentally and theoretically. FIGURE 4 shows the results of some experiments by the present inventor. The solid curve of FIGURE 4 shows the theoretical idea apparent-acoustic-length variation of a modern B-flat trumpet, the plotted points represent apparent-acoustic-lengths calculated directly from the experimentally determined resonance frequencies of a high quality, commercial modern B-flat trumpet. The circles represent behavior with the mouthpiece, and the squares represent behavior without the mouthpiece. The points are for the first eight modes of the trumpet air column.

The points for the first mode, either with, or without the mouthpiece are far away from the musically desirable curve, but this is of no importance because the first vibrational mode of a modern trumpet is not used musically. The second modal points are correctly on the curve, and with the mouthpiece, the third and fourth modal points, and also the eighth modal point, are correctly on the curve. The fifth, sixth, and seventh modal points are not quite on the curve, even with the mouthpiece; but the seventh mode like the first, is not musically useful, and it can be shown that the deviations of the fifth and sixth modes are musically tolerable. However, without the mouthpiece, the deviations of the upper modes are well beyond the musically tolerable. The main observation to be made is that for all modes above the second, the mouthpiece itself somehow performs a significant part of the lengthening effect.

Figure 5:
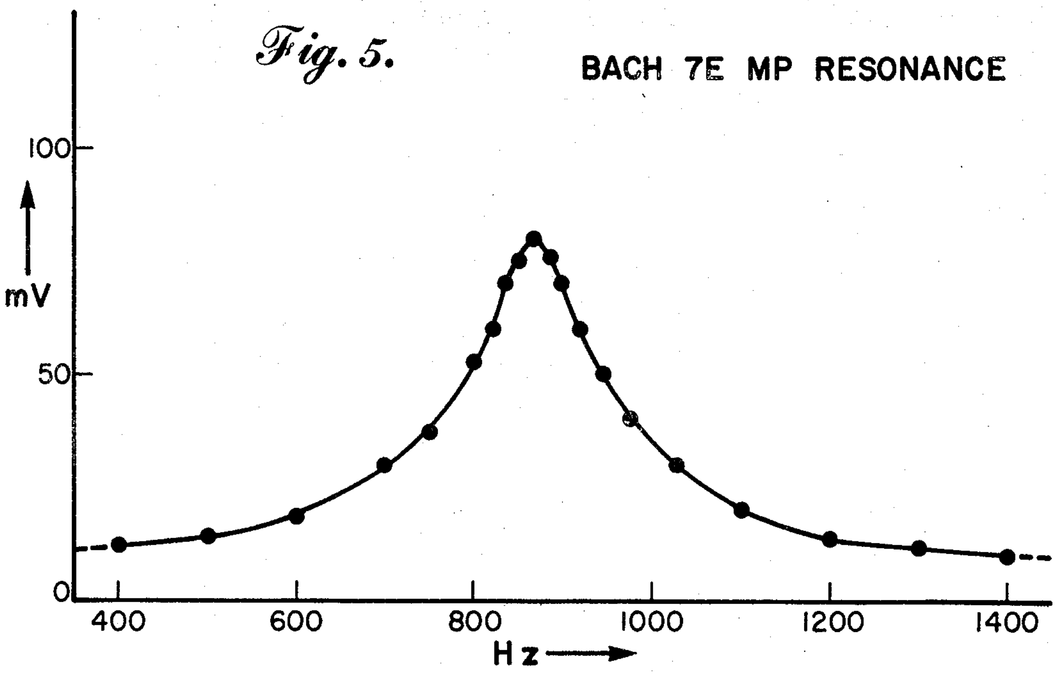
FIGURE 5 shows a resonance curve for a modern commercial trumpet mouthpiece, when it is not coupled to a trumpet, but is acting alone as a Helmholtz resonator, picking up ambient sound through its backbore.

The explanation of how the mouthpiece adds apparent-acoustic-length to the trumpet as the frequency rises, has been given in a technical paper presented orally to the Acoustical Society of America, in November 1966. The mouthpiece, viewed from the trumpet side, is a cavity fronted by a relatively small orifice, and so it should act as a Helmholtz resonator. As a matter of experimental fact, it does. FIGURE 5 shows the frequency response of a mouthpiece only, tested in the system of FIGURE 2. This particular mouthpiece has a strong resonance at about 870 Hz. This is between the seventh and eighth modal frequencies of a modern B-flat trumpet.

By equating the acoustic wave impedance in a tube to the acoustic impedance of a terminating Helmholtz resonator, the present inventor has derived an equation for the apparent lengthening effect, $\Delta x$, of a terminating Helmholtz resonator. It is:

$$\operatorname{ctn}\left(\frac{2\pi\Delta x}{\lambda}\right)=S(b/AV)^{1/2}\left(\frac{f_r}{f}-\frac{f}{f_r}\right) \qquad (4)$$

where $\Delta x$=the apparent lengthening (e.g. in cm.)

$\lambda$=the wavelength (in cm.)

S=the cross-sectional area of the tube (in cm.$^2$)

$b$=the effective length of the orifice of the resonator (in cm.)

A=the effective cross-sectional area of the orifice (in cm.$^2$)

V=the volume of the resonator cavity (in cm.$^3$)

$f$=frequency (in Hz.)

$f_r$=the resonant frequency of the resonator

Using Equation 4 as a starting point, several useful deductions can be made. One of the most useful is the answer to an old question: Where is the effective beginning of the acoustic air column of the trumpet? Bouasse taught that it was the throat of the mouthpiece (in French, the "grain"). Others have thought that it was at the same location as the actual beginning, that is, at the lip-plane of the mouthpiece. It can be shown with Equation 4 that at very low frequencies, the front end of the trumpet, acoustically, acts the same as if it were terminated by its own substantially constant diameter of tubing, extended by just exactly the length that would enclose a volume equal to the internal volume of the mouthpiece. This correct answer does not necessarily correspond to either of the previously taught answers, but in practical cases it is not far from the answer of Bouasse. The most important use of Equation 4 is to show that as the frequency rises, the mouthpiece adds an apparent-acoustic-length, increasing as the frequency increases, and that this length rises to a maximum a little beyond the resonant frequency of the resonator, and then slowly declines again with frequency.

Equation 4 can be used to estimate by calculation, some of the quantities to be described below, which are best determined by experiment, and this specification, and the claims that follow, are intended to cover an over-all method, in which some of the experimental steps can have calculational substitutes, but it should be made clear that for confident results, all of the taught experimental steps are best performed experimentally, rather than computationally. One of the reasons for this is that the geometrical shape of a mouthpiece is complicated; and it is even hard to tell where the resonator cavity ends, and the orifice begins. So the numbers to be inserted into Equation 4 are hard to estimate. Equation 4 is best used as an over-all theoretical packaging tool, holding all the relevant physical quantities together, showing their interdependence, and showing which quantities may be varied to compensate for given variations in any of the other quantities.

The best way to determine the apparent-acoustic-length adding function of a mouthpiece is to insert the mouthpiece into a long piece of unflared tubing; the longer the better, for closeness of modes in the frequency range of interest. Then, with apparatus like that of FIGURE 2, determine all the modal frequencies through the frequency range of interest (e.g. 100 to 1600 Hz). Finally, from the experimental data, calculate the apparent-length of the system according to Equation 1, and subtract from the apparent length, the actual length. If it is desired to do this experiment with accuracies of the order of one percent, an end correction must be made for the open end of the tube, and it is even advisable to make Helmholtz-Kirchhoff corrections for the small variations of sound velocity with frequency in the unflared tube. Such corrections are well known to those skilled in acoustics.

From this point forward, the description will turn specifically toward the making of a trumpet in high-F (tuning note 698 Hz.) but like all the previous descriptions, it is intended to represent trumpets in general. One reason for choosing a trumpet in high-F for illustration is that, in such a trumpet, the mouthpiece effect is even more significant than it is in a conventional B-flat trumpet.

Figure 6:
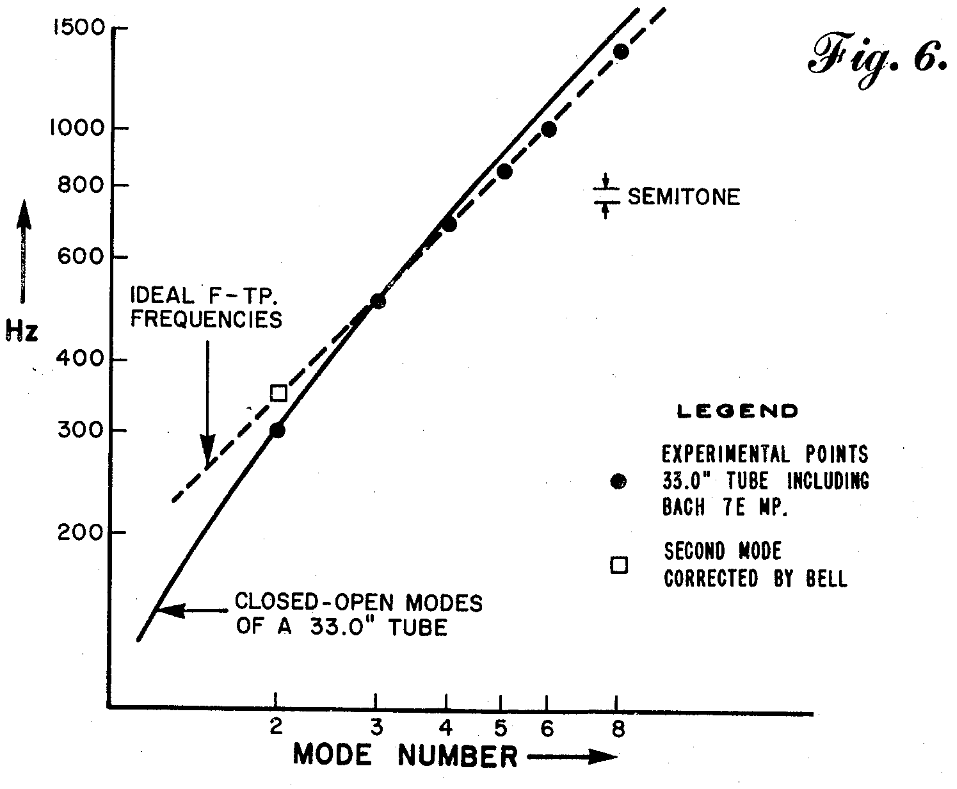
FIGURE 6 illustrates, in terms of alterations in resonance frequencies, the experimental design and construction of an improved trumpet in high-F (tuning note, 698 Hz.), according to the method of the present invention.

Reference is now made to FIGURE 6, which represents, in terms of modal frequencies, the essential steps leading to the construction of the trumpet. FIGURE 6 shows model frequencies on a logarithmic scale plotted against mode numbers also on a logarithmic scale. With such coordinates, the plot of the modal frequencies of a theoretically perfect instrument would lie on a straight, 45-degree, line. Furthermore, equal distances in the vertical direction represent equal intervals on the musical scale. The vertical distance corresponding to the musical interval of a semitone is indicated on the graph.

The plotted circular points on FIGURE 6 represent the completion of what may be considered to be the first two steps of determining the shape of the trumpet air column.

First, a long piece of unflared tubing is attached to the mouthpiece. The inside diameter of the tubing here was 0.44 inch (nominally 0.4375 inch but the four figures are not acoustically significant). This is the "valve bore" of certain "small bore" B-flat trumpets. It is actually a large bore for an instrument in high-F. The largest diameter of the flared backbore of modern commercial mouthpieces is not this large, and so it is desirable to couple the mouthpiece to the unflared tubing with a transition section, tapered from the one diameter to the other, to prevent excessive acoustic wave reflections, as well as useless turbulence of the direct current air that is to be blown through the completed trumpet. However, such a transition section is merely desirable; it is not absolutely necessary. The transition section may be made up to several inches long, in which case, its action significantly supplements the action of the mouthpiece in changing the apparent-acoustic-length with frequency. Most contemporary commercial trumpets have such a section, called a "leaderpipe." It will be understood that if a leaderpipe is used, its action and the action of the mouthpiece are to be measured in cooperation, and it is their combined acoustic-length changing effect that is to be taken into account in the final bell design.

After the mouthpiece is attached to the unflared tubing, either with, or without a transition section, the resonant frequencies of the air-column inside the system composed of the mouthpiece closed off at its lip plane, and the attached length of tubing are measured in an apparatus like that of FIGURE 2. It will be found that the lowest natural modes have frequencies that would be expected from Equation 1, except that the length, *i*, will not be the actual length of the system. Instead, it will be equal to the actual length of unflared tubing plus an apparent length which will be equal to the internal volume of the mouthpiece (plus transition section if any) divided by the internal cross-sectional area of the unflared tubing. For the modes above the lowest modes, this added apparent length will seem to increase, and these modes will be increasingly lower in frequency than they would be expected to be, if Equation 1 were obeyed and if $l$ were constant. FIGURE 6 shows how they will actually appear on the frequency scale. The solid line represents the natural modes of a simple 33.0 inch tube. The circular experimental points represent the modes of a composite tube and mouthpiece system that behaves as a 33.0 inch tube in its first two modes and then increases in apparent length because of the mouthpiece effect. It will be noticed that the circular points almost lie on a 45-degree line, or that the mouthpiece effect almost causes the system to behave as an ideal trumpet throughout its upper modes. It does not do so exactly, but the deviation from ideality is not musically significant.

The circular points of FIGURE 6 show qualitatively how any length of tubing attached to a mouthpiece will behave, and they show quantitatively what happened when the length of tubing was experimentally varied until a length was found, for which the fourth to eighth modal frequencies best approximated the musically-desirable fourth to eighth model frequencies of a trumpet in high-F.

After the upper modes are properly placed, the problem remains of properly placing the lower modes, down to the second. In the case represented in FIGURE 6, adjustment is needed of only the second mode. The problem is to raise the second mode without destroying the already good placement of the upper modes. This can be done with a bell stem, so designed that it has the proper apparent-length-varying properties in the low frequencies but attains a substantially constant apparent length approximately equal to its actual length, at the upper frequencies.

Reference is now made to P. M. Morse, "Vibration and Sound," 2nd ed., McGraw-Hill, New York (1948) especially pp. 279–282. Morse teaches that catenoidal, horns transmit sound with phase velocities higher than the normal velocity of sound, and that this higher velocity, $c'$ is related to the normal velocity of sound, $c$, by the expression $$c' = c/[1-(f_0/f)^2]^{1/2} \qquad (5)$$

where $f$=frequency (Hz.)
$f_0$=the "cutoff frequency."

The "cutoff frequency" is calculable by another expression in terms of the flare rate of the horn:

$$f_0 = c/2\pi h \qquad (6)$$

where $h$=the flare constant in the horn shape equation $$D = D_0 \cos h(x/h) \qquad (7)$$

where

D=the diameter at the axial position $x$
$D_0$=the diameter at $x$=0.

Inserting $f_0$ from Equation 6 into Equation 5 gives $$c' = c/[1-(c/2\pi hf)^2]^{1/2} \qquad (8)$$

In the terms of interest here, this means that the catenoidal horn acts as if its apparent length, $l$, were less than its actual length, $l_a$ according to the expression:

$$l=l_a[1-(c/2\pi hf)^2]^{1/2} \qquad (9)$$

The problem stated above of raising the second mode, without raising the upper modes, can be solved with the aid of Equation 9. The physical solution is to replace part of the unflared tubing distal to the mouthpiece, with a catenoidal section that will have the correct shorter apparent-acoustic-length at the second modal frequency, but will have an apparent-acoustic-length equal substantially to its actual length at the upper frequencies, when the contraction coefficient of Equation 9 becomes substantially equal to unity.

At this point there is a subtlety involved. One cannot replace part of an unflared tubing by a flared section, and expect the unreplaced part of the acoustic column to do exactly what it was doing before, except under very restricted conditions. There must be proper phase matching at the junction. Reference may be made here to the already cited Kent patent, U.S. 2,987,950. It will be appreciated that the complexity of the equations in column 10, and of the curves in FIGURE 11, of that patent, represents phase matching difficulty.

The present inventor solves the phase matching problem at the second modal frequency by cutting the unflared tubing at the position of the velocity node at that frequency, and replacing the cut-off section with a catenoid whose first modal frequency (closed at the small end and open at the large) is the intended second modal frequency of the new composite air column. Then both the unreplaced portion of the original acoustic column and its new catenoidal ending can cooperate exactly in natural resonance at the desired second mode of the composite system.

It will be appreciated from the theory that there could be an infinite number of catenoidal horns having a first modal frequency (closed at the small end and open at the large) that would equal the desired second modal frequency of the composite system, but only one of these would also have the desired actual length at higher frequencies, which would cause it to act just as the desirable length of unflared tubing acted at those frequencies.

At this point, one can give an almost complete description of the required catenoidal section. To do this, it is most convenient for clarification, to neglect end effects, and to describe the required catenoidal section as follows:

Let $L(u)$ be the length of unflared tubing found to give the best approximation to the musically desirable upper modes, let $L(2)$ be the lesser length, for which the determined second modal frequency, $f_2$, is correct, and let $\lambda_2/4$ be the length that a quarter-wave of the frequency $f_2$ would have in unflared tubing. Then one can say that the required catenoidal section should have an actual length:

$$l_a=\lambda_2/4+L(u)-L(2) \qquad (10)$$

and it should have an apparent-acoustic-length at the frequency $f_2$:

$$l(f_2)=\lambda_2/4 \qquad (11)$$

If such a section is attached to the unflared tubing at the position, $L(2)-\lambda_2/4$, then the apparent acoustic length of the system must become $L(2)$ at the frequency, $f_2$, and it must become $L(u)$ at the upper frequencies.

It will now be appreciated that because the actual length of the required catenoidal section has been specified in Equation 10, and the apparent length at frequency, $f_2$, has been specified in Equation 11, these two quantities may be used with Equation 9 to calculate the flare constant, $h$. Then the final shape of the catenoidal section may be computed.

For the trumpet represented in FIGURE 6, the quantity $L(u)-L(2)$ was determined to be 4.1 inches and $\lambda_2/4$ (taking into account a Helmholtz-Kirchhoff correction) was 9.6 inches, so the actual length of the desired catenoidal section was 13.7 inches and the desired apparent length at 349 Hz. was 9.6 inches. This gave a flare constant, $h$, of 8.70 inches. The catenoidal section was made, and attached to the cut-off unflared tubing, and as indicated in FIGURE 6, the second mode was corrected up to the musically desirable frequency.

In order to avoid possible confusion, it should perhaps be mentioned that in the phrase "catenoidal section" as used in this specification, the word "section" means a section of the musical instrument, not an arbitrary part of the catenoid. The catenoidal curve of the catenoidal bell stem alway beings at $x=0$ of Equation 7, and so is itself without flare at the very beginning. Therefore it joins perfectly, in an acoustic sense, to the unflared tubing.

At this point, the description has covered the essential steps in making a trumpet that has improved relative intonation among its so-called open tones. However, there is another step remaining if such a trumpet is to have presently conventional tonal quality, and even presently conventional appearance. The catenoidal section, as prescribed above, has an inside diameter of only 1.22 inches at its large end, which is 13.7 inches in the axial direction from its small end of internal diameter, 0.44 inch. As is well known, modern trumpets in the familiar key of B-flat have final bell diameters of about 5 inches. The less well known trumpets in high-F have final bell diameters of about 4 inches. It is important to the understanding of the present invention to appreciate that the bell can be considered to comprise two sections, the long stem determining the intonation, and the final flare, or "skirt" determining the tonal quality and aesthetic appearance. That the bell can be so considered is not a new concept. It was stated in 1878 by Blaikley (Philosophical Mag. Ser. 5, v. 6, pp. 119–128, esp. p. 127) that "the pitch is not altered by the extension of the flange curvature beyond a point at which its tangent would make an angle of about 40 degrees with the axis of the instrument, although the quality of tone is decidedly altered by such extension." In more modern terms one does not try to specify a particular angle of the profile curve at which the acoustic column seems to terminate. One thinks rather of the flare constant, $h$, as determining whether or not waves of certain frequencies can be held within a horn in a standing wave condition, or will radiate away from the internal surface of the horn as if it were merely a baffle. This suggests that at the axial position where one wishes the standing wave column to terminate, one should markedly increase the flare rate of the bell curve, or in terms used here, decrease the effective flare constant, $h$. One must make this marked flare rate increase so as to expand the bell to, say, 4 inches within an axial distance of, say, 1.25 inches, and the only important restriction is that, mainly for aesthetic reasons, one must not change the slope of the profile curve stepwise; the slope change must be perfectly gradual. Mathematically, there are infinitely many ways this can be done. One way is to start, at the axial position where the acoustic column is to be effectively terminated, multiplying the diametral ordinate of the bell stem profile curve by a function which has the ordinal value of unity, and has zero slope at that axial position, but which increases in slope very rapidly. The present inventor chose a multiplying function of the form:

$$y=\exp[0.1][(1+w^2/0.01)^{1/2}-1] \qquad (12)$$

where $w$=the axial coordinate, in inches, minus 13.7, but the detailed reasons for his choice are not important for purposes of this specification. The analytical form of the flare increasing function is unimportant. All that is important is that the profile curve of the bell skirt should be tangent to the profile curve of the catenoidal section at its large end, and the profile curve should have a flare rate several times that of the catenoidal section.

Reference is now made to FIGURE 7 showing intonation plots of eight trumpets, the first seven of them being modern commercial trumpets of high reputation, both in Europe and the United States, and the eighth being the trumpet in high-F whose construction has been described. The plots are presented in musician's terms, the ideal, or intended, open-tone frequencies being represented by their musical scale positions and the intonation errors being represented by horizontal displacement from a vertical line through the tuning note. The deviations plotted in FIGURE 7 are with reference to the ideal intended notes. The deviations are measured in musical cents, or hundredths of a semitone.

It will be understood that, in musician's terms, the vertical scale positions do not always represent the same musical frequencies. The fourth mode tuning note for a trumpeter may always be written "third space C" on the musical staff, but it is played as C (standard pitch, 523 Hz.) only when the trumpeter is using a "C" trumpet." When he is using the conventional B-flat trumpet, third space C is played as third line B-flat (standard pitch, 466 Hz.); when he is using a trumpet in high F, third space C is played as fifth line F (standard pitch, 698 Hz.); and when he is using a trumpet in high B-flat, third space C is played as high B-flat (standard pitch, 932 Hz.).

Figure 7A:
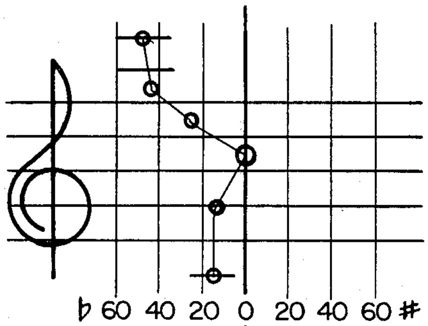
FIGURE 7 shows eight intonation plots on musical staves, plots of a sort sometimes used to show musicians the intonational imperfections of their instruments. The data are from experimental measurements. Seven of the plots represent modern commercial trumpets of high reputation both in Europe and the United States. The eighth plot represents an F-trumpet constructed according to the method of the present invention.
Figure 7E:
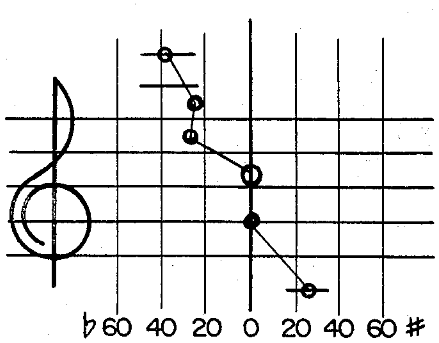
Figure 7B:
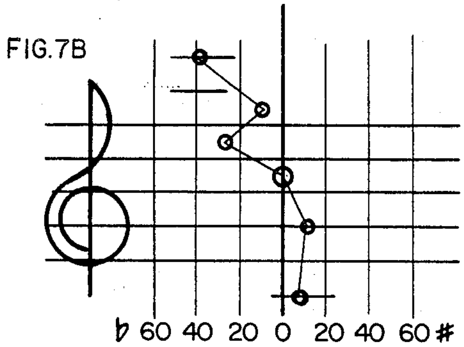
Figure 7F:
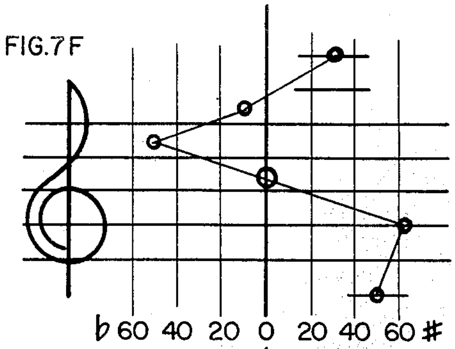
Figure 7C:
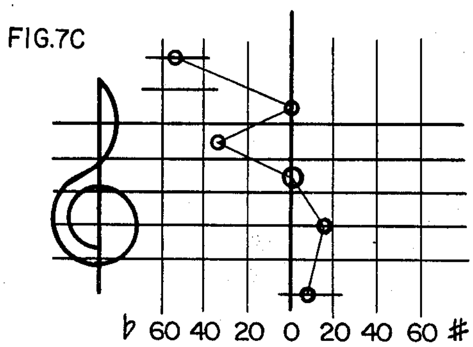
Figure 7G:
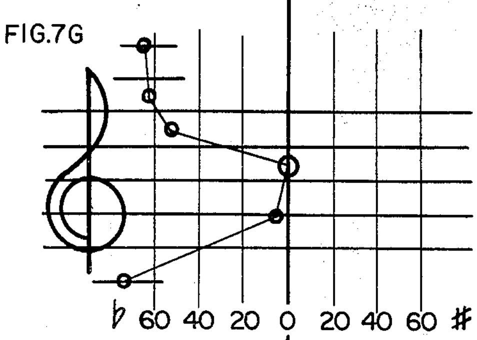
Figure 7D:
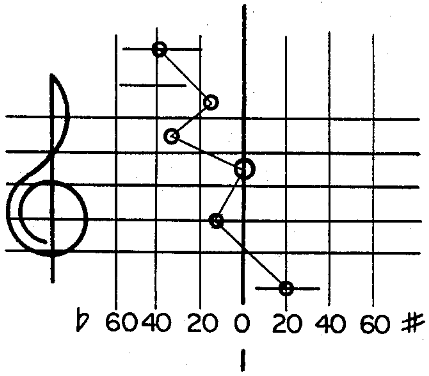
Figure 7H:
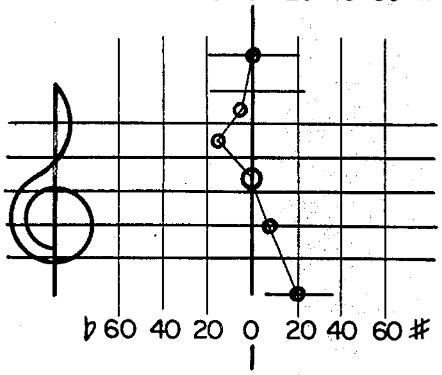

FIGURES 7A to 7C represent experimental measurements, with the apparatus of FIGURE 2, on three conventional B-flat trumpets; FIGURES 7D and 7E represent C trumpets, FIGURE 7F represents a trumpet in high B-flat, and FIGURE 7G represents a trumpet in high F. FIGURE 7H represents the trumpet of the present invention.

The diagrams of FIGURE 7 clearly indicate that the intonation of the new trumpet is superior. However, some explanation may be in order to clarify the meaning of some of the large intonational errors shown for the previous trumpets. Obviously, modern trumpeters, especially trumpeters in the better symphonic orchestras, do not play with intonational errors of the magnitude of those indicated in FIGURE 7. They subconsciously correct, by varying lip tension and breath pressure, for the intonational errors of their instruments, so that the played notes are in error by only small fractions, say, less than one-eighth, of a semitone. Therefore, a trumpet having better intonation than a modern conventional trumpet is not an absolute necessity for a good trumpeter who can play the existing trumpets satisfactorily. But it is obvious, without the necessity of argument, that a trumpet with better intonation will allow the trumpeter to spend less of his energy fighting the primitive imperfections of his instrument, and more of his energy in artistic nuances.

A highly-skilled trumpeter, with a good musical ear, who can achieve correct pitch with only subconscious effort, has less absolute need for good intonation in his instrument than has a beginning trumpeter. Obviously, however, good intonation helps them both.

There are other, technical, advantages to better relative intonation between the various open tones of the trumpet, advantages which are not yet completely understood. When the various vibrational modes are more nearly true harmonics of each other, they assist each other in the transient building up of vibration within the instrument, the transition from silence to full sound, or from one frequency to another frequency. In musican's terms, this means an improvement of "the attack," and an improvement in such things as trilling ability. Symphonic trumpeters have noticed these musical features about the trumpet of the present invention.

The foregoing material completely describes a method of making an improved trumpet (or other member of the trumpet family) and the essential parts of the trumpet itself. In order that the claims at the end of this specification may be completely understood, it is appropriate to add some final remarks about mouthpieces and leaderpipes. Because the trumpets of the present invention are designed and constructed to cooperate optimally with particular mouthpieces (and when they are used, particular leaderpipes) it is, of course, ideal if the identical mouthpieces, and leaderpipes can be used on a final instrument that were used in its design. But this ideal is not attainable if a particular trumpet is to be reproduced many times, for commercial purposes. It is sufficient that the mouthpiece that was used in the design of the trumpet was representative of the mouthpiece to be used on the final instrument, or was acoustically similar to it. This is a somewhat looser requirement than that the original and the final mouthpieces should be of exactly the same shape. They need not be. One can deduce from Equation 4, together with equations not given, which lead to Equation 4, that to be acoustically similar, two mouthpieces need only have approximately the same cup volume and approximately the same ratio of effective throat area to effective throat length. The experimental proof of acoustic similarity is, of course, a test on apparatus like that of FIGURE 2 to determine apparent-acoustic-length versus frequency.

Leaderpipes are usually of uncomplicated profile curvature. Their air columns are usually merely conic frusta, of uniform taper. It can be said of them, that acoustic similarity does imply similar shape.

A remark should be added also about "end corrections," which have been briefly mentioned hereinbefore. The end correction for the catenoidal section will necessarily be different from the end correction for the tube of valve bore diameter, but it is not worthwhile to try to calculate that difference, because the bell skirt will alter it unpredictably. However, the unknown end correction differences are small, and they are substantially frequency independent, so they can be readily compensated by minor adjustments of the main tuning slide of the trumpet, after it built.

No description of valves, or of their placement in a trumpet, has been given, because the shaping and the placement of the valves in the trumpet of this invention is no different from that in known commercial trumpets.

In summary, a method has been described of determining the shape of the air-column of a trumpet (or other member of the trumpet family) so that the relative intonation of its open tones will be superior to that of previous trumpets. The bell of the instrument is specifically designed to cooperate optimally with a representative mouthpiece. The trumpet is easier for any player to play in tune, and it enables highly skilled players to spend less effort in achieving proper intonation, and more in artistic nuances.

I claim:

1. A method of shaping the air-column of a cup-mouthpiece wind instrument of the trumpet-trombone family, so that the intonation of the instrument will approximate ideal intonation, in which method account is taken of the apparent-acoustical-length-varying property of a mouthpiece representative of the mouthpiece to be used on the final instrument, comprising:

(a) measuring the modal resonant frequencies of the air-column inside the system composed of said representative mouthpiece closed off at its lip plane and at least one attached length of unflared tubing of substantially constant diameter, said tubing having a diameter substantially equal to the desired "valve bore" diameter of said instrument and open at the end distal to said mouthpiece.

(b) determining the length of said tubing $L(u)$, required best to approximate the musically-desirable fourth to eight modal frequencies of said instrument, (c) determining the lesser length, $L(2)$, for which the second modal frequency of said system equals the musically desirable second modal frequency of said instrument, which second modal frequency has a wavelength $\lambda_2$ in said unflared tubing, (d) attaching to a length, $L(2)-\lambda_2/4$, of said unflared tubing, a catenoidal bell stem of actual length $$\lambda_2/4+L(u)-L(2)$$

whose apparent-acoustical-length at said musically desirable second modal frequency is $\lambda_2/4$, so that the apparent-acoustical-length of the unflared tubing plus said catenoidal bell stem is L(2) at the musically desirable second modal frequency and $L(u)$ at the upper modal frequencies.

2. The method of claim 1, in which step (a) is extensively carried out with one length of said tubing sufficiently long to give enough measured modes over the desired musical frequency range to permit accurate determination of the apparent-acoustic-length versus frequency function of said representative mouthpiece, and at least one of said steps (b) and (c) may then be carried out by calculation.

3. The method of claim 1 in which said tubing is attached to said representative mouthpiece through a tapered leaderpipe, and the system whose resonant frequencies are measured, as well as the finally determined instrument air column, therefore includes said leaderpipe.

4. The method of claim 1 in which the air-column is further prolonged at the bell end by a bell skirt whose profile curve is tangent to the curve of said catenoidal bell stem at the large end of said catenoidal bell stem, but whose profile curve has a flare rate several times that of said catenoidal bell stem so that said bell skirt does not significantly affect the resonant frequencies of the first eight modes of said air-column.

5. A cup-mouthpiece wind instrument of the trumpet-trombone family, whose intonation approximates ideal intonation when it is used with a mouthpiece acoustically similar to the mouthpiece that was used in designing the air-column of said instrument, comprising:

(a) a length $L(2)-\lambda_2/4$ of tubing of constant, "valve bore" diameter, and (b) a length $\lambda_2/4+L(u)-L(2)$ of a single section catenoidal bell stem, whose small, beginning diameter is said "valve bore" diameter, and whose flare rate is chosen so that said catenoidal bell stem has the apparent-acoustical length $\lambda_2/4$ at the musically desirable second modal frequency of said instrument, where: $L(u)$ is the length of said tubing of constant "valve bore" diameter that, attached to said mouthpiece so that with said mouthpiece closed off at its lip plane and said tubing being open at the end distal to said mouthpiece, forms an acoustic system whose fourth to eighth modal frequencies best approximate the musically-desirable fourth to eighth modal frequencies of said instrument; L(2) is the lesser length of said tubing that, attached as described, produces the musically desirable second modal frequency; and $\lambda_2$ is the wavelength of the second modal frequency in said tubing of constant diameter in said acoustic system.

6. The cup-mouthpiece wind instrument of claim 5, in which said tubing of length $L(2)-\lambda_2/4$, is preceded at the mouthpiece end by a tapered leaderpipe forming a transition section between the largest diameter of the backbore of the mouthpiece, and the still larger, constant, "valve bore" diameter, and the length definitions of $L(u)$ and L(2), are based on experimental measurements involving said leaderpipe, rather than direct attachment to said mouthpiece.

7. The cup-mouthpiece wind instrument of claim 5, wherein the air-column is further prolonged at the bell end by a bell skirt whose profile curve is tangent to the curve of said catenoidal bell stem at the large end of said catenoidal bell stem with the flare rate of said bell skirt being several times that of said catenoidal bell stem so that said bell skirt does not significantly affect the resonant frequencies of the first eight modes of said air-column.

References Cited

UNITED STATES PATENTS 2,987,950 6/1961 Kent ............... 84—388

RICHARD B. WILKINSON, Primary Examiner

L. R. FRANKLIN, Assistant Examiner

U.S. Cl. X.R.

84—398